Jan. 4, 1966 V. ECKHARDT 3,227,345
APPARATUS FOR FEEDING STRIP STOCK TO A HELICAL
SEAM PIPE MAKING MACHINE
Filed Dec. 31, 1962
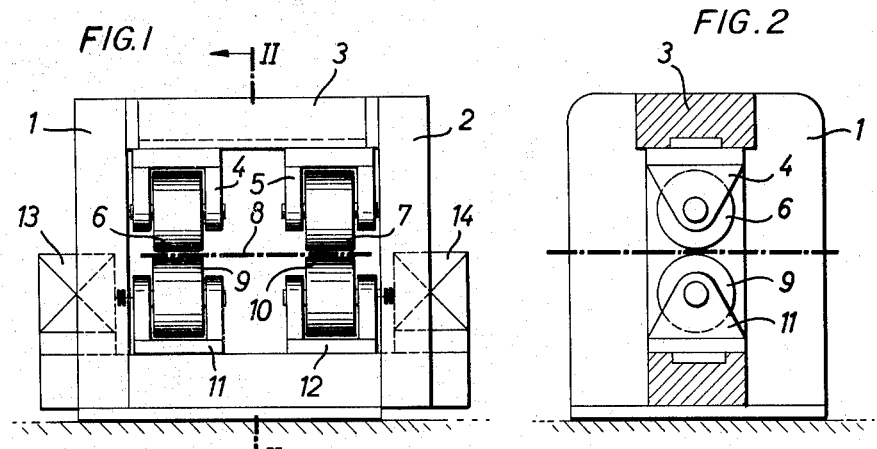
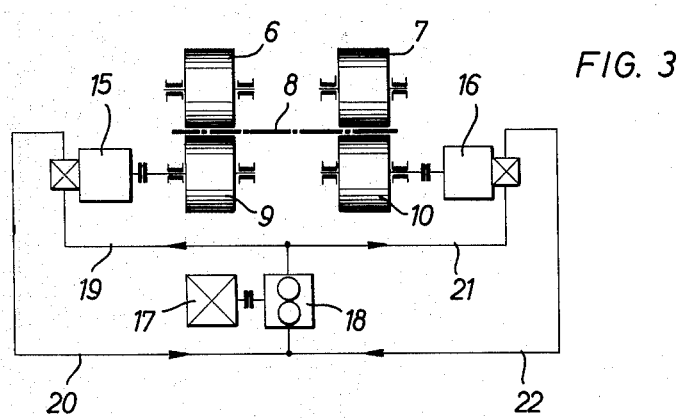
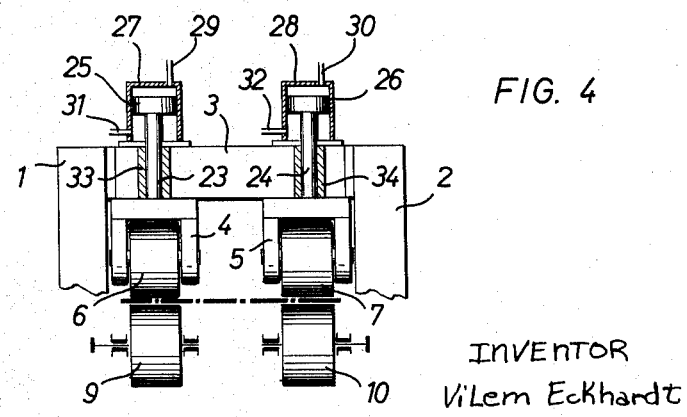
INVENTOR
Vilem Eckhardt
By: Dicke & Craig
ATTORNEYS United States Patent Office 3,227,345
Patented Jan. 4, 1966

3,227,345
APPARATUS FOR FEEDING STRIP STOCK TO A HELICAL SEAM PIPE MAKING MACHINE
Vilem Eckhardt, Paris, France, assignor to Driam Societe Anonyme, Vaduz, Liechtenstein
Filed Dec. 31, 1962, Ser. No. 248,590
Claims priority, application Germany, Jan. 3, 1962, D 37,807
4 Claims. (Cl. 226—176)

The present invention relates to an apparatus for feeding strip stock to a helical seam pipe making machine by means of feed rollers.

The feeding apparatus which are known for this purpose employ feed rollers which have a length approximately equal to or greater than the width of the widest strip to be worked upon in the pipe making machine. Even if the edges of the particular strip extend parallel to its direction of feed toward the forming tool, there is always the possibility that because of differences in the thickness of the strip, at least one of the feed rollers will not act uniformly upon the strip. If the edges of the strip do not extend parallel to its direction of feed, relative displacements are always bound to occur between the strip and the feed rollers since the peripheral speed of the feed rollers does not change. This may result in deformations of the metal strip before it is worked upon by the forming tool.

It is an object of the present invention to provide a feeding apparatus for strip stock for a helical seam pipe making machine which overcomes the above-mentioned disadvantages. For this purpose the invention provides that, instead of employing a single pair of feed rollers of a width substantially corresponding to the maximum width of the different strips to be fed at different times to the forming tool, at least two pairs of rollers should be employed which have a width considerably smaller than the maximum width of the strips and that at least one roller of each pair is driven, that each driven roller is driven separately at a constant but adjustable torque, and that the rollers of each pair are adapted to be pressed against each other at a constant but adjustable pressure so as to remain in constant engagement with the strip without slipping relative thereto. This results in a better engagement of the feed rollers with the strip which, in turn, prevents local deformations of the strip, and it has the further advantage that the structure of the feeding apparatus is more simple and of a lighter weight than the feeding apparatus which were previously employed since in place of the two heavy rollers of the latter apparatus it is now possible to employ several light roller units. It is another feature of the invention that the two pairs of rollers which act upon the surfaces of the strip near the opposite edge portions thereof may be shifted relative to each other whereby it is very easily possible to adapt the feeding apparatus to strip stock of different widths. For this purpose, only one pair of rollers at one side of the metal strip or both pairs may be adjustable in lateral directions. A further feature of the invention consists in the possibility of employing the two pairs of rollers for the purpose of carrying out certain work upon the edge portions of the strip stock even though it may vary in width and without thereby impairing the principal function of the rollers to feed the strip. Such work to be carried out by the feed rollers may consist, for example, of deforming the edges of the strip in acordance with any desired curved shape, or of beveling or trimming the edges.

It is desirable to drive at least one roller of each pair by means of a hydraulic motor and to connect all hydraulic motors in parallel to a pump or pump system. Since the pump or pump system supplies oil under a constant pressure of high degree the torque of each hydraulic motor also remains constant despite its variable speed. The hydraulic motors must, of course, be operated within the range in which the torque remains constant when the output increases or decreases, that is, not within the range in which the output is constant and the torque decreases. For certain purposes it may be advisable to vary the pressure of the rollers in relation to any difference which might occur between the lengths of the opposite edges of the strip.

The features and advantages of the present invention will become more clearly apparent from the following detailed description thereof which is to be read with reference to the accompanying diagrammatic drawings, in which—

FIGURE 1 shows a front view of a feeding apparatus according to the invention, as seen from the side of the form tool;

FIGURE 2 shows a cross section taken along line II—II of FIGURE 1;

FIGURE 3 shows a diagrammatic illustration of the drive for one roller of each of two pairs by means of hydraulic motors; while FIGURE 4 shows a front view, partly in section, of a part of a feeding apparatus similar to that as shown in FIGURE 1.

As illustrated in FIGURES 1 and 2 of the drawings, the feeding apparatus according to the invention comprises a pair of uprights 1 and 2 and a crossbar 3 which should be adjustable to different elevations to permit strip stock of different thicknesses to be fed to the forming tool. Crossbar 3 carries bearing brackets 4 and 5 which may be either raised and lowered by crossbar 3 or independently of the latter. These bearing brackets 4 and 5 rotatably support the rollers 6 and 7 which act upon the upper surface of the strip 8 to be conveyed. This strip 8 rests on rollers 9 and 10 which are rotatably mounted in stationary bearing brackets 11 and 12. Each of these rollers 9 and 10 may be driven by a separate geared motor 13 or 14, respectively. In the particular embodiment of the invention as shown in FIGURES 1 and 2, each individual roller has a width substantially equal to one fourth of the width of the strip to be conveyed.

The rollers which are driven directly, that is, in the present case the rollers 9 and 10, may also be driven by means of hydraulic motors 15 and 16, as indicated in FIGURE 3, which are connected in parallel through conduits 19, 20 and 21, 22, respectively, to a pump 18 which may be driven by a motor 17. This has the advantage that the torque of each roller 9 or 10 which is driven by an oil motor 15 or 16 remains constant even though the peripheral speed of the respective roller changes as the result of the fact that one roller rotates at a different speed relative to the strip than a driven roller on the other side of the strip.

If the contact pressure between the rollers of each pair is to be changed or to be always held at a constant value, it is advisable to design the rollers 6 and 7 which are not driven to be lifted and lowered independently of each other relative to the crossbar 3, for example, by connecting the bearing brackets 4 and 5 to piston rods 23 and 24, respectively, each of which is connected to a piston 25 or 26 which is movable in a cylinder 27 or 28, respectively, under the action of a hydraulic medium which is supplied to the cylinders through intake lines 29 and 30. Cylinders 27 and 28 are, however, preferably also provided with return lines 31 and 32 to permit the pistons to be retracted.

If the distance between the two pairs of rollers 6, 9 and 7, 10 should be adjustable, guide bushings 33 and 34 together with the upper bearing brackets 4 and 5 and the lower bearing brackets 11 and 12 together with the driving motors should be designed so as to be adjustable to different positions transversely to the direction of feed of the strip and then to be locked in the respective positions. Of course, it is also possible to provide driving means for both rollers of each pair and also to provide more than two pairs of rollers. In the latter case, the pairs of rollers at one side of the strip may, if desired, be staggered relative to those at the other side of the strip. This may be of advantage particularly if strips of different widths to be worked upon, that is, if at one time relatively narrow strips and at other times relatively wide strips are to be used.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for feeding strip stock to a helical seam pipe making machine by means of feed rollers, said apparatus comprising at least two pairs of said rollers, each of said rollers having a width considerably smaller than the maximum width of the various strips of said strip stock to be worked upon, at least one roller of each pair being adapted to be driven, means for driving each driven roller separately at a constant but adjustable torque, and means for pressing the rollers of each pair against each other at a constant but adjustable pressure so as to remain in constant engagement with said strip stock without slipping relative thereto, said means for driving each driven roller comprising a separate hydraulic motor, pump means, all said hydraulic motors being connected in parallel to said pump means, said hydraulic motors operating within a speed range in which the torque remains constant, and said means for pressing the rollers of each pair comprising hydraulic means.

2. An apparatus as defined in claim 1, wherein the pressure between the rollers of each pair is adjustable in relation to any difference occurring between the lengths of the opposite edges of the strip.

3. An apparatus as defined in claim 1, wherein the distance between the two rollers of each pair is adjustable in accordance with the thickness of the particular strip to be fed.

4. An apparatus as defined in claim 1 wherein the distance between the corresponding rollers on each side of a strip to be fed is adjustable.

References Cited by the Examiner
UNITED STATES PATENTS

| | | | |
|---|---|---|---|
| 1,875,777 | 9/1932 | Tackaberry | 226—17 |
| 1,939,113 | 12/1933 | Ferris | 226—111 X |
| 2,737,386 | 3/1956 | Reher | 226—17 |
| 2,804,968 | 9/1957 | Elliott et al. | 226—185 |
| 2,880,838 | 4/1959 | Panissidi | 226—9 |
| 3,100,069 | 8/1963 | Richards | 226—17 |

FOREIGN PATENTS 445,737  4/1936  Great Britain.

ROBERT B. REEVES, *Primary Examiner.*

ANDRES H. NIELSEN, SAMUEL F. COLEMAN,
*Examiners.*